(12) United States Patent
Kamoda

(10) Patent No.: US 6,618,562 B2
(45) Date of Patent: Sep. 9, 2003

(54) CAMERA

(75) Inventor: Takashi Kamoda, Saitama (JP)

(73) Assignee: Fuji Photo Optical Co., Ltd., Saitama (JP)

(*) Notice: Subject to any disclaimer, the term of this patent is extended or adjusted under 35 U.S.C. 154(b) by 0 days.

(21) Appl. No.: 10/086,668

(22) Filed: Mar. 4, 2002

(65) Prior Publication Data

US 2002/0122669 A1 Sep. 5, 2002

(30) Foreign Application Priority Data

Mar. 2, 2001 (JP) ........................................ 2001-059186

(51) Int. Cl.⁷ .............................................. G03B 17/00
(52) U.S. Cl. ........................ 396/266; 396/503; 396/538
(58) Field of Search ................................. 396/266, 502, 396/503, 538, 542

(56) References Cited

U.S. PATENT DOCUMENTS 4,752,795 A * 6/1988 Malloy-Desormeaux .... 396/408
5,608,478 A * 3/1997 Kamoda ..................... 396/503
5,664,248 A    9/1997 Naka et al.
5,729,784 A    3/1998 Naka et al.
5,984,537 A * 11/1999 Park ........................... 396/443
6,490,411 B1 * 12/2002 Mazzacani et al. ............ 396/6

FOREIGN PATENT DOCUMENTS

JP    09-073127    3/1997

* cited by examiner

Primary Examiner—David Gray
(74) Attorney, Agent, or Firm—Young & Thompson

(57) ABSTRACT

After loading a film cassette into a cassette chamber, a lid of the cassette chamber is closed. Interlocking with the lid, a lid lock member is moved to a lock position to lock the lid. When the lid lock member is moved to the lock position, a shutter lock member allows to operate a shutter release button. When the shutter release button is operated, a shutter is driven and a photo film is advanced. When the lid lock member is moved to an unlock position, the lid is opened. When the cassette chamber is opened, the shutter lock member prevents the operation of the shutter release button to prohibit the advancing of the photo film.

19 Claims, 5 Drawing Sheets

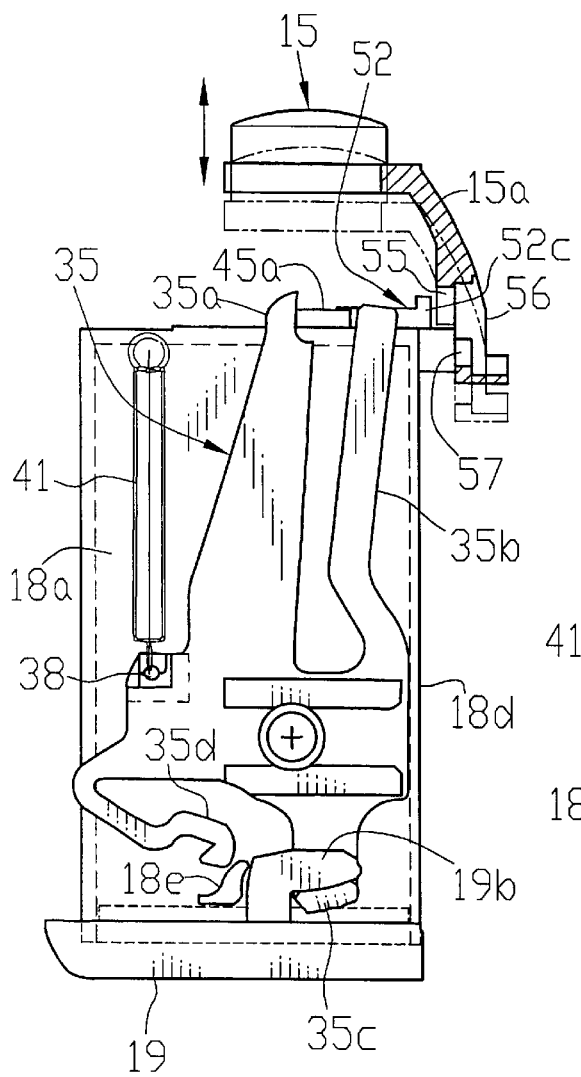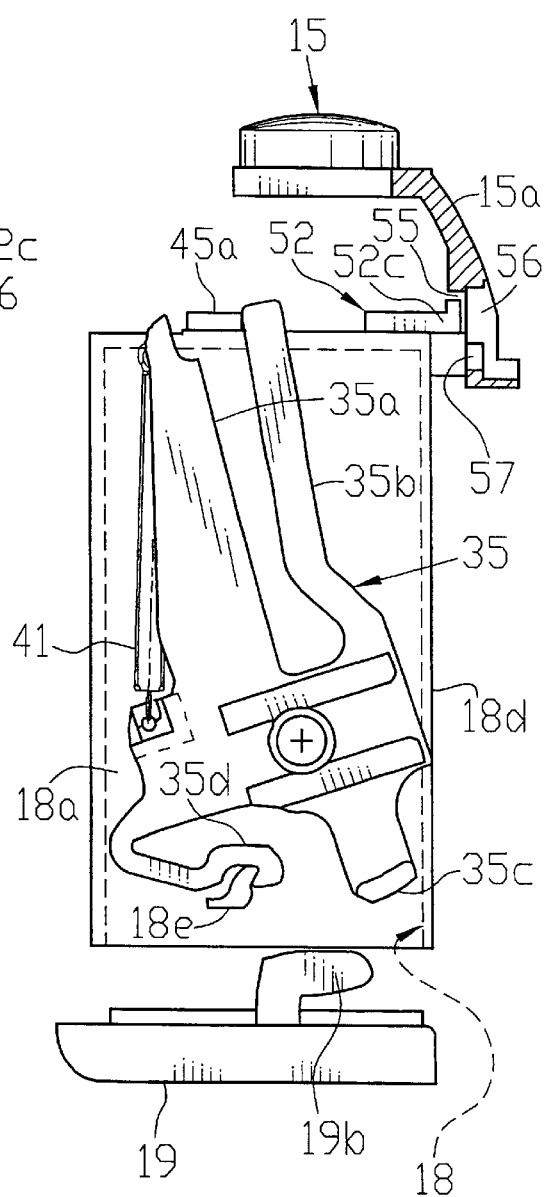

FIG. 5A
FIG. 5B
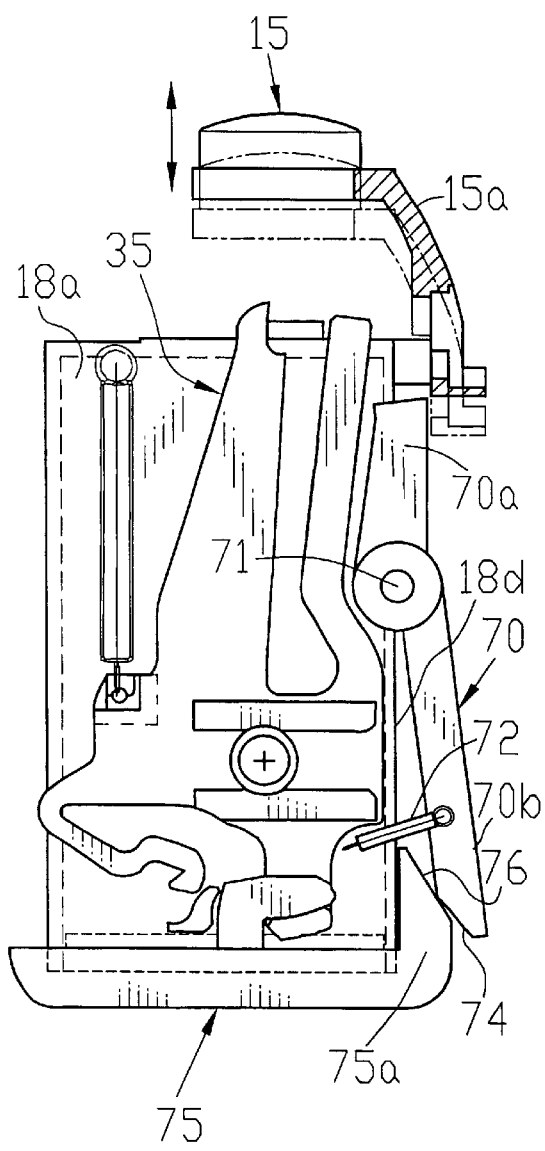
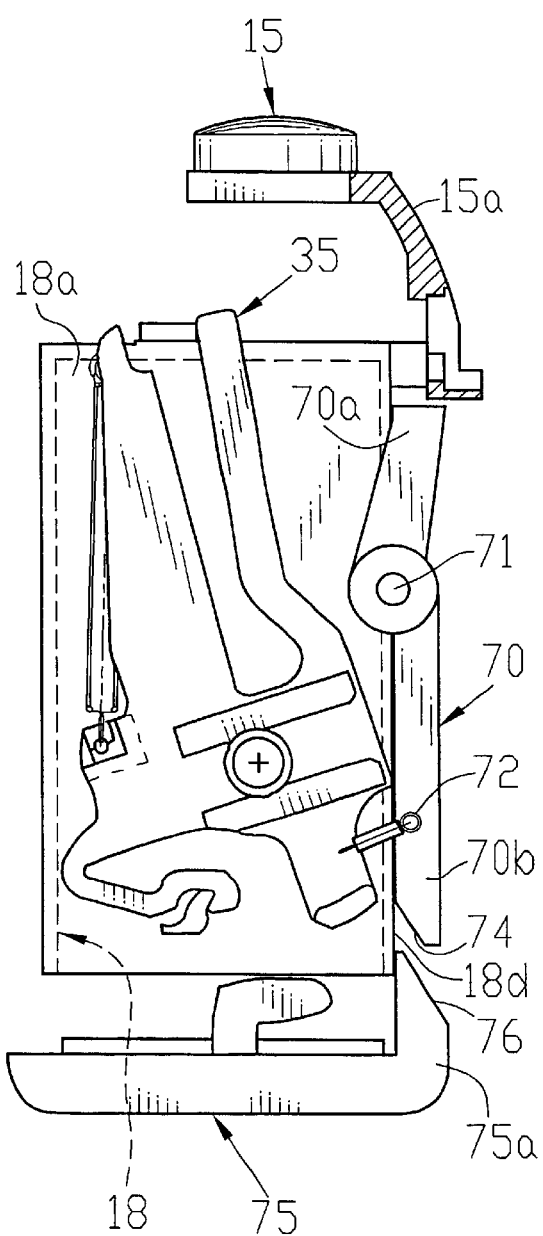

CAMERA

BACKGROUND OF THE INVENTION

1. Field of the Invention

The present invention relates to a camera, and more particularly to a camera in which it is prevented to set the first frame while a lid of a cassette chamber is open.

2. Description Related to the Prior Art

In the market, there is a camera adopting an advanced photo system, in which an IX 240 film cassette (hereafter film cassette) is used. In a cassette housing of the film cassette, a photo film is entirely contained and rolled about a spool. When the spool is rotated, the photo film is advanced or rewound. A film passage mouth formed on the cassette housing for feeding the photo film is opened and closed with a cassette door.

After loading the film cassette in a cassette chamber of the camera, the lid of the cassette chamber is closed. Thereby the cassette door is opened with a member in the camera. Then a feed motor is driven at a predetermined time (for example 4.5 seconds) to rotate the spool in an advancing direction for setting the first frame to an exposure aperture. Thus the photo film is advanced from the film passage mouth. When the first frame of the photo film is set to an exposure aperture, the feed motor stops.

In the normal camera, sensors are provided to detect for the loading of the film cassette and the lid of the cassette chamber. Based on signals of the sensors, the photo film is advanced to set the first frame to the exposure aperture. The camera produced in a low cost, however, cannot be provided with the sensor. Accordingly, there are many types of the camera which begins the first frame to set to the exposure aperture corresponding to depress of the shutter release button. Sometimes, there is a user who forgets to unload the film cassette from the cassette chamber after rewinding all of the photo film in the film cassette, and depresses the shutter release button. Then the photo film in the film cassette is advanced again and double exposures may be carried out.

This problem is solved in a camera disclosed in a Japanese Patent Laid-open Publication No. 9-73127. The camera has a shutter lock member, a holder and an unlock mechanism. The shutter lock member prohibits operating a shutter release button, corresponding to operation of a rewinding button to rewind the photo film. The holder holds the shutter lock member in a shutter release button lock position. Corresponding to opening the lid of the film cassette, the unlock mechanism makes the holder releasing the shutter lock member so as to unlock the shutter release button without jamming.

In the camera described above, the shutter release button is locked on rewinding the photo film and after completion thereof with the cassette door opened. However, when the lid of the cassette chamber is not perfectly closed at loading the film cassette therein, the shutter release button is not locked. In this situation, while the cassette door is closed, the shutter release button is sometimes depressed, and the spool is rotated in an advancing direction. Therefore, the photo film jams in the film cassette, which damages the photo film and makes unusable. Further, as the spool can not be rotated, a large load causes a failure of an advancing system of the camera.

SUMMARY OF THE INVENTION

An object of the present invention is to provide a camera in which the photo film is prevented from jamming in the cassette housing.

Another object of the present invention is to provide a camera in which it is prevented to set the first frame to an exposure aperture while a lid of the cassette chamber is not closed.

In order to achieve the object and the others, in a camera of the present invention, a door actuate mechanism closes and opens a cassette door of a film cassette loaded in a cassette chamber, and a shutter lock mechanism locks and unlocks a shutter release button, interlocking with open and close of a lid of the cassette chamber. The shutter lock mechanism is provided with a shutter lock member which is set in a lock position when the lid is opened, and in an unlock position when the lid is closed. In the lock position, the shutter lock member inserts in a moving path of the shutter release button to prevent the depress thereof. In the unlock position, as the shutter lock member is retracted from the moving path of the shutter release button such that the shutter release button may be depressed, and as the cassette door is opened, a leading end of the photo film may be advanced from the film cassette without jamming.

According to the camera of the present invention, even though having a simple structure, the shutter release button is not depressed to set the first frame to the exposure aperture when the lid is opened. Therefore, the photo film never jams in the film cassette and is not damaged, and the camera does not have failure.

BRIEF DISCRIPTION OF THE DRAWINGS

The above objects and advantages of the present invention will become easily understood by one of ordinary skill in the art when the following detailed description would be read in connection with the accompanying drawings.

FIG. 3A is a side view of the cassette chamber, when the shutter release button is unlocked;

FIG. 3B is a side view of the cassette chamber, when the shutter release button is locked;

FIG. 5A is a side view of the cassette chamber of the camera in the second embodiment of the present invention when the shutter release button is unlocked;

FIG. 5B is a side view of the cassette chamber similar to FIG. 5A when the shutter release button is locked.

PREFERRED EMBODIMENTS OF THE INVENTION

Figure 1:
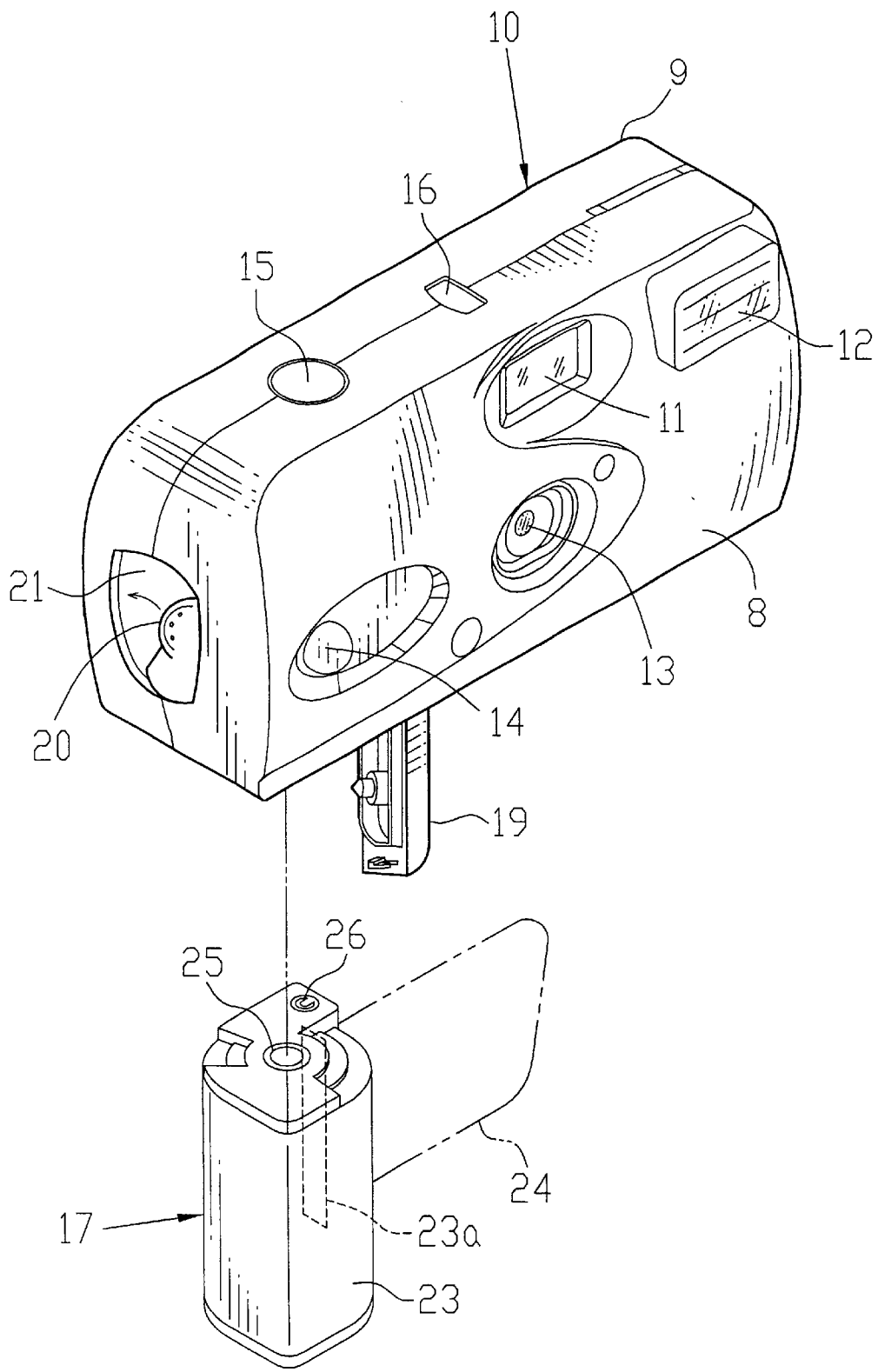
FIG. 1 is a perspective view of a camera of the present invention.

In FIG. 1, a camera 10 has a front cover 8 and a rear cover 9. In a front cover 8 there appear a viewfinder window 11, a flashlight projector 12, a taking lens 13 and a lens barrier opener 14. The camera 10 includes a main body 30 (see FIG. 2) between the front cover 8 and a rear cover 9. On a top of the camera 10, there are a shutter release button 15 and a film counter window 16. To a bottom of the camera 10 is swingably attached a lid 19 which is opened and closed when a film cassette 17 is loaded in and unloaded from a cassette chamber 18 (see FIGS. 2 and 3) formed in the main body 30. In a side face of the camera 10, a recess portion 21 is formed in which a lid opener button is rotatably provided.

The film cassette 17 is called IX240. The film cassette 17 includes a cassette housing 23, a photo film 24 contained in the cassette housing 23 and a spool 25 about which the photo film 24 is wound.

The spool 25 is rotatably attached to the cassette housing 23. A side face of the cassette housing 23 is provided with a film passage mouth 23a and a cassette door 26. From bottom and upper faces, edges of the spool 25 and the cassette door 26 appear. The cassette door 26 closes the film passage mouth 23a to keep an inside thereof in a light tight fashion.

When the spool 25 is rotated in an advancing direction, the photo film 24 is fed out through the film passage mouth 23a of the cassette housing 23. When the spool 25 is rotated in a winding direction, the photo film 24 is wound in the cassette housing 23.

Figure 2:
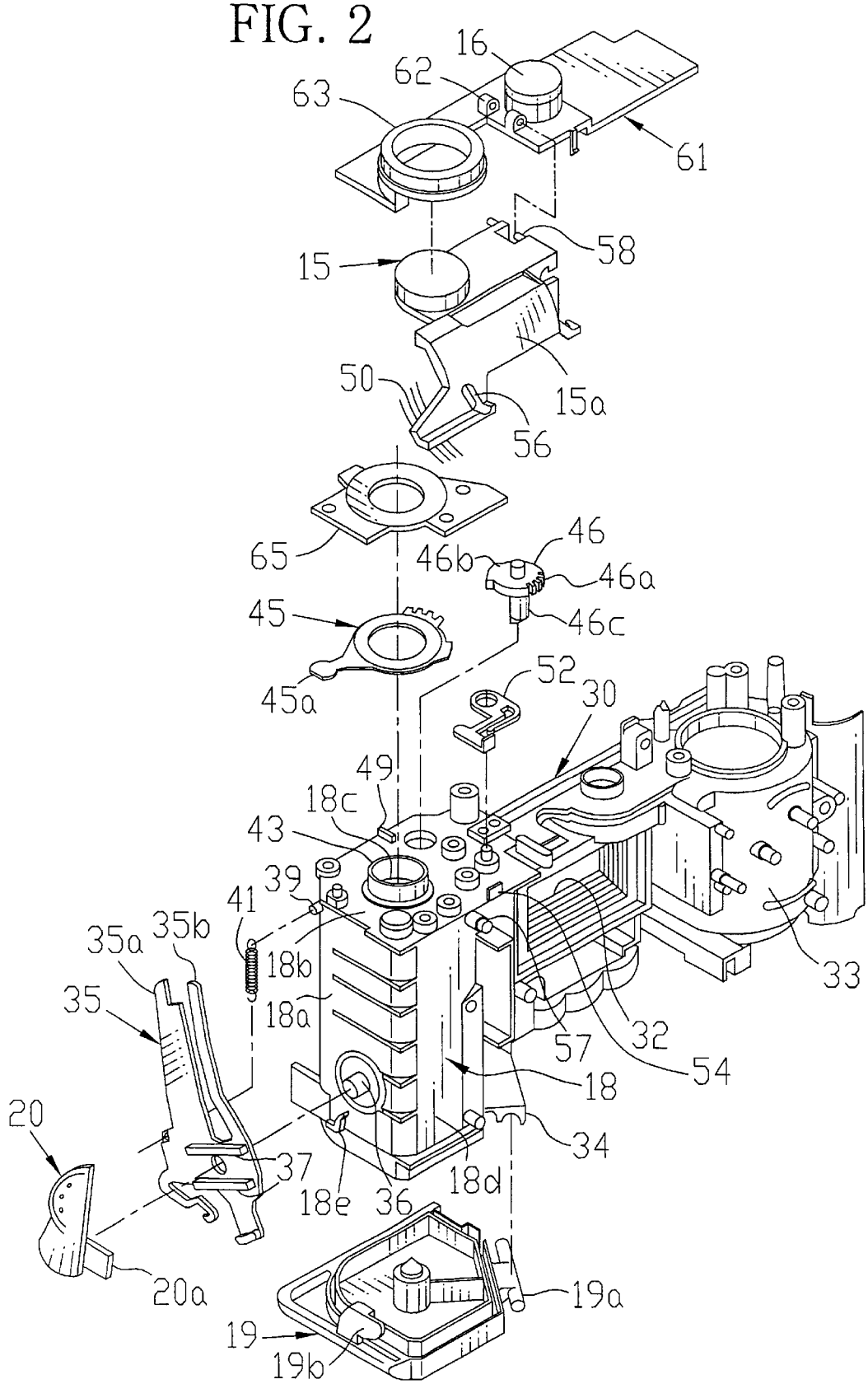
FIG. 2 is a perspective view of a main body of the camera, wherein a shutter lock mechanism attached on an outer surface of a cassette chamber is exploded.

In FIG. 2, in the main body 30 are further formed an exposure aperture 32 for determining an exposure area on the photo film 24, a take-up chamber 33 in which the exposed photo film is taken up, and the like. In an upper side of the cassette chamber 18, the shutter release button 15 is provided.

In an edge of a base portion 15a of the shutter release button 15, a male hinge 58 is formed and engages with a female hinge 62 formed on a transparent cover plate 61 such that the shutter release button 15 may be rotatably attached to the cover plate 61. The cover plate 61 is provided with a shutter release button guide 63 in which the shutter release button 15 is moved, and the film counter window 16 formed like a lens. Above the interlocking lever 45, an indicator tongue 65 is disposed to indicate a situation of use of the photo film 17 to for example "complete exposure". In a lower side of the cassette chamber 18, there is a shaft holder 34 to rotatably hold a shaft 19a of the lid 19 in cooperation with a bottom of the front cover 8.

A shutter release button lock mechanism is provided for a side wall 18a and a top wall 18b of the cassette chamber 18. The shutter release button lock mechanism is constituted of a lid opener button 20, a lid lock lever 35, an interlocking lever 45, a cassette door actuate member 46 and a shutter lock lever 52.

In the top wall 18b, a hole 18c is formed. Through the hole 18c, a spool drive shaft (not shown) is disposed to rotate the spool 25. An edge of the hole 18c is provided with a cylindrical portion 43. On a periphery of the cylindrical portion 43, the interlock lever 45 is rotatably attached. A connecting portion 45a is formed as to protrude from the interlock lever 45. The connecting portion 45a is disposed between top ends 35a, 35b of the lid lock lever 35 and is moved by rotation of the lid lock lever 35.

To the side wall 18a, the lid lock lever 35 is rotatably attached through a shaft 36. On a side of the lid lock lever 35, a pair of protrusions 37 is formed and fits on a segment 20a of the lid opener button 20. A coil spring 41 connects a hole 38 (see, FIGS. 3A and 3B) formed on an edge of the lid lock lever 35 and a protrusion 39 formed on the side wall 18a.

As shown in FIG. 3A, when the lid 19 is closed, a craw 19b formed thereon is engaged with a bottom end 35c of the lid lock lever 35. The shutter lock lever 52 is bent in an L-shape to form an end 52c. As the end 52c is retracted from a moving path of the shutter release button 15, the shutter release button 15 can be depressed.

When the shutter release button 15 is depressed, a brush 50 (see FIG. 2) provided for the base portion 15a contacts to printed contact points of a print board (not shown) attached to a front wall 18d of the cassette chamber 18 and drives a feed motor (not shown) to start advancing the photo film 24. On the photo film 24, a pair of perforations is formed to determine an area of each respective frame. There is a frame detect mechanism for detecting the pair of perforations during advancing the photo film 24. When the frame detect mechanism detects the pair of perforations, the feed motor stops. Accordingly, when the first operation of the shutter release button 15 is carried out after loading the film cassette 17, the feed motor is driven until the first pair of perforations is detected to set the first frame behind the exposure aperture 32. The feed motor can be driven at the maximum for 4.5 seconds, considering the case when the film cassette 17 is not loaded in the cassette chamber. When the second operation of the shutter release button 15 is carried out, the feed motor is driven until the other pair of perforations of the second frame is detected to set the second frame behind the exposure aperture 32. From the second advancing for one frame, the motor is driven for about one second. Note that, the frame detect mechanism includes, for example, a lever (not shown) in a film passage way (not shown) near the cassette chamber 18. The lever is pressed and shifted by the photo film 24 to actuate a switch (not shown).

Further, as shown in FIG. 3B, when the lid 19 is open, the shutter lock lever 52 is inserted in the moving path of the shutter release button 15. The cutout 55 of the base portion 15a confronts to the end 52c. Therefore the shutter release button cannot be depressed. In the base portion 15a, a slit 56 is formed with following to the cutout 55. The slit 56 fits to the protrusion 57 provided on the front wall 18d and determines thereby the moving path and a stroke of the shutter release button 15. Further, as the coil spring 41 is stretched, it biases the lid lock lever 35 in a clockwise direction. However, as a hook 35d of the lid lock lever 35 is engaged with a craw 18e formed on the side wall 18a, the lid lock lever 35 does not rotate in the clockwise direction. Note that the lid 19 is biased in an opening direction with a biasing member (not shown).

Figure 4A:
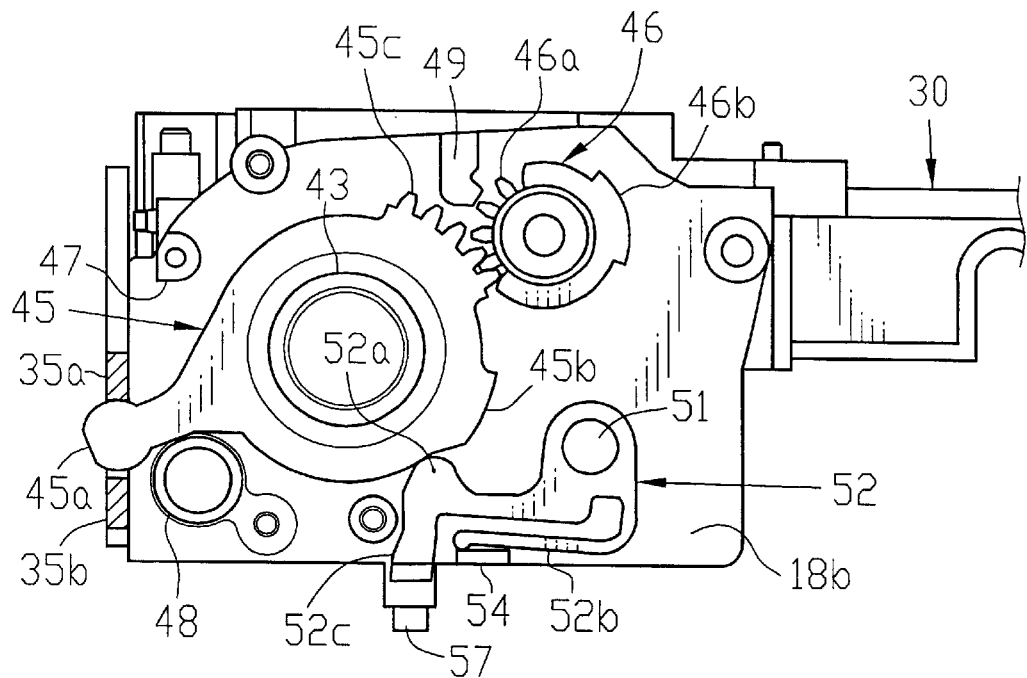
FIG. 4A is a plan view of a top face of the cassette chamber, when the shutter release button is unlocked.
Figure 4B:
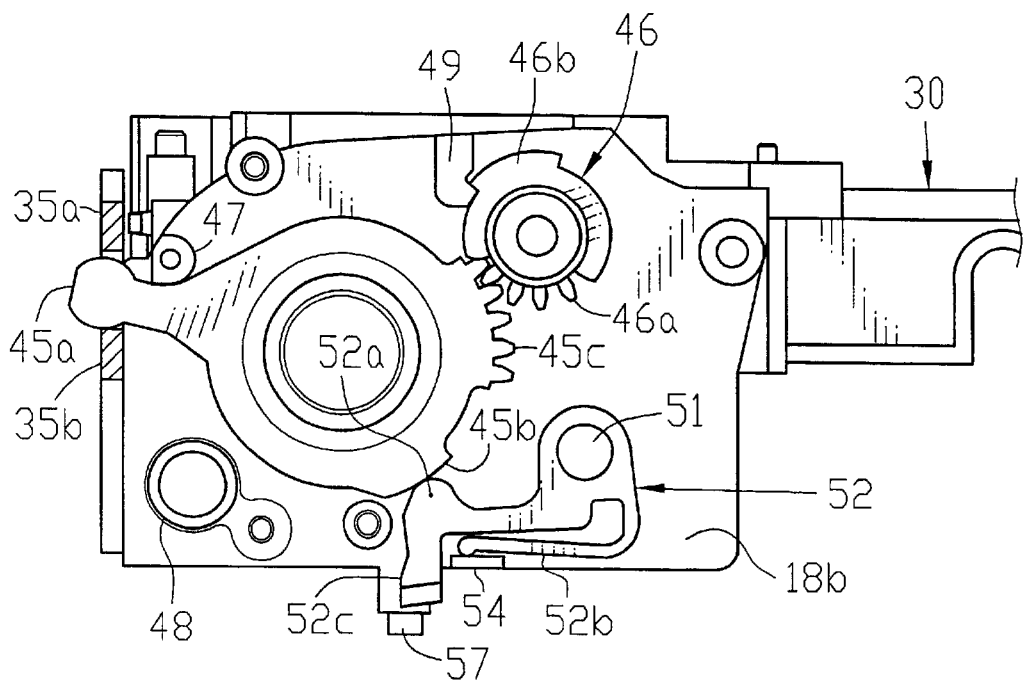
FIG. 4B is a plan view of a top face of the cassette chamber, when the shutter release button is locked.

As shown in FIGS. 4A and 4B, the interlocking lever 45 has further a cam portion 45b and a gear portion 45c. A rotational area of the interlocking lever 45 is regulated between stoppers 47, 48 formed on the top wall 18b. The gear portion 45c is meshed with a gear portion 46a to rotate the cassette door actuate member 46 in accordance with rotation of the interlocking lever 45. The cassette door actuate member 46 has a protuberance 46b opposite to the gear portion 46a. A lower end 46c of the cassette door actuate member 46 is connected to the cassette door 26 of the cassette housing 23 for opening the cassette door 26.

The shutter lock lever 52 is rotatably attached to a pivot 51 formed on the top wall 18b of the cassette chamber 18. In the shutter lock lever 52 is formed a plate spring portion 52b contacting to a segment 54 formed on the top wall 18b to bias a contact portion 52a. Thus the contact portion 52a contacts to the cam portion 45b. When the lid 19 is close, as shown in FIG. 4A, the contact portion contacts to a foot of the cam portion 45b. When the lid 92 is open, as shown in FIG. 4B, the contact portion 52a contacts to a top of the cam portion 45b. Accordingly, the end 52c of the shutter lock lever 52 is shifted out into the moving path of the shutter release button 15. Note that the protuberance 46b contacts to a stopper 49 which has a hook shape and is formed on the top wall 18b to regulate a rotational area of the cassette door 26 in a closing direction.

Effects of the embodiment above described will be explained. When the lid opener button 20 is rotated in the arrowed direction in FIG. 1, the lid lock lever 35 is rotated in the counterclockwise direction against the bias of the coil spring 41, and the craw 19b disengages from the bottom end 35c to open the lid 19. In this case, the connecting portion 45a is pushed by the bottom end 35c such that the interlocking lever 45 may be rotated in the clockwise direction of FIG. 4, and the cam portion 45b pushes the contact portion 52a of the shutter lock lever 52 toward the front side of the camera 10. Thereby, the end 52c is inserted in the moving path of the shutter release button 15, and the shutter release button 15 cannot be depressed.

In this situation, the lid 19 is slightly opened. Therefore, the lid 19 is further opened with hands, and then the fresh film cassette 17 is loaded in the cassette chamber 18. Then, the lid 19 is closed.

Thereby the craw 19b pushes the hook 35d upwards and disengages from the craw 18e. The lid lock lever 35 is biased by the coil spring 41 to rotate in the clockwise direction to engage with the craw 19b. The connecting portion 45a is pressed by the top ends 35a, 35b to rotate the interlocking lever 45, and the cam portion 45b leaves the contact portion 52a of the shutter lock lever 52. Therefore the end 52c is retracted from the moving path of the shutter release button 15. Further, at the same time the cassette door actuate member 46 is rotated, and the cassette door 26 of the film cassette is opened.

In the embodiment, the end 52c is retracted from the moving path of the shutter release button 15, while the lid 19 is close. Therefore, the shutter release button 15 can be depressed. When the shutter release button 15 is depressed, the feed motor is driven just after shutter release to rotate the spool 25. Then, the photo film 24 is fed out through the film passage mouth 23a of the cassette housing 23. When the frame detect mechanism detects that the first frame is set to the exposure aperture 32, the motor stops.

After framing, the shutter release button 15 is depressed. When the shutter is released, the feed motor drives to rewind the photo film 24 for a length of the one frame until the second frame is set to the exposure aperture 32. If all of the frames are exposed, variation of the tension of the photo film 24 is detected with the sensor. Accordingly the feed motor drives to reversely rotate the spool 25 such that the photo film 24 is rewound into the cassette housing 23. When the photo film 24 is entirely contained in the cassette housing 23, the rewinding of the photo film is complete. When the lid opener button 20 is moved in the arrowed direction in FIG. 1, the cassette door 26 is closed, and the lid 1a slightly opens for unloading the film cassette 17.

When the lid 19 is slightly opened, the end 52c of the shutter lock lever is inserted in the moving path of the shutter release button 15. Therefore the shutter release button 15 cannot be depressed, and the first frame is never set to the exposure aperture 32. Accordingly, while the cassette door 26 is close, the first frame is not set to the exposure aperture 32. Therefore, the film cassette 17 is not damaged and the camera 10 is not broken.

Further, as shown in FIGS. 5A and 5B, a shutter lock lever 70 may be rotatablly attached through a shaft 71 to the side wall 18a in a vertical direction. A lower arm 70b of the shutter lock lever 70 is provided with a coil spring 72 that biases the lower arm 70b in a clockwise direction such so as to contact to the front wall 18d. Further, in the lower arm 70b a contact face 74 is formed.

As shown in FIG. 5A, when a lid 75 is close, a protrusion of the lid 75 is inserted between the lower arm 60b and the front wall 18d. As an upper arm 70a is retracted from the moving path of the base portion 15a, the shutter release button 15 can be depressed. As shown in FIG. 5B, when the lid 75 is opened, the coil spring 72 biases the lower part 70b to contact to the front wall 18d. Accordingly, the upper arm 70a is entered in the moving path of the shutter release button 15. Therefore the shutter release button 15 cannot be depressed. When the lid 75 is closed, a top edge 76 formed on the protrusion 75a contacts to the contact face 74. Then, the top edge 76 is guided in a space between the lower arm 70b and the front wall 18d to press the lower arm 70b. Thereby the shutter lock lever 70 is rotated in a counterclockwise direction against the bias of the coil spring 72. Note that the shutter lock lever 70 may be attached for example to an inner face of the front cover 8.

In the embodiment above described, the shutter lock lever enters in and leaves from the moving path of the shutter release button. However, the present invention is not limited in it. For example, in the first embodiment, the shutter lock lever may be omitted. Instead thereof, a protrusion may be formed on an edge of the interlocking lever so as to enter in and leave from the moving path of the shutter release button.

Various changes and modifications are possible in the present invention and may be understood to be within the present invention.

What is claimed is:

1. A camera having a shutter release button, wherein a photo film is advanced from a film cassette in correspondence with operation of said shutter release button, said camera comprising:

a cassette chamber for containing said film cassette;

a lid for opening and closing said cassette chamber;

a shutter lock mechanism for preventing an operation of said shutter release button when said lid is opened, and for allowing the operation of said shutter release button when said lid is closed; and an exposure aperture for exposing said photo film advanced from said film cassette in said cassette chamber;

wherein after closing said lid a first frame on said photo film is set to said exposure aperture for operation of said shutter release button;

wherein said shutter lock mechanism includes a shutter lock member which is set in a lock position to lock said shutter release button when said lid is opened, and set in an unlock position to unlock said shutter release button when said lid is closed.

2. A camera according to claim 1, wherein in said lock position a part of said shutter lock member is entered in a moving path of said shutter release button such that said shutter release button cannot be depressed, and in said unlock position said part is retracted from said moving path such that said shutter release button may be depressed.

3. A camera according to claim 2, wherein said shutter lock mechanism further includes a lid lock member disposed between said lid and said shutter lock member, said lid lock member engages with said lid when said lid is closed, and disengages from said lid when said lid is opened.

4. A camera according to claim 3, wherein said shutter lock mechanism includes an interlocking member contacting to both of said lid lock member and said shutter lock member, and said interlocking member transmits movement of said lid lock member to said shutter lock member.

5. A camera according to claim 4, wherein said interlocking member has a protrusion, said shutter lock member has a contact portion for contacting said protrusion of said interlocking member to set said shutter lock member to a lock position when a lid is opened, and said protuberance leaves from said contact portion so as to set said shutter lock member in said unlock position when said lid is closed.

6. A camera according to claim 5, wherein said shutter lock member has a plate-like spring portion for biasing said shutter lock member such that said contact portion may contact to said interlocking member.

7. A camera according to claim 5, wherein said lid lock member is biased by a coil spring forwards said engaging position.

8. A camera according to claim 5, wherein said shutter lock member is attached to a top of said cassette chamber.

9. A camera according to claim 2, wherein said shutter lock member is rotatably attached to a side wall of said cassette chamber and biased by a spring to said lock position, and a part of said lid of said cassette chamber contacts to said shutter lock member so as to move said shutter lock member to said unlock position when said lid closes said cassette chamber.

10. A camera having a shutter release button, wherein said photo film is advanced from said film cassette, said film cassette includes a cassette housing containing said photo film and a cassette door for opening/closing a passage mouth of said photo film, said camera comprising:
  a cassette chamber for containing said film cassette;
  a lid of said cassette chamber, being movable between an open position and a close position, in said open position a cassette chamber being open, and in said close position a cassette chamber being close; and
  a lid lock member being movable between a lock position and an unlock position, for locking said lid in said lock position, and for permitting in said unlock position said lid to move to said open position;
  an interlocking member interlocking with said lid lock member, for opening said cassette door when said lid lock member is in said lock position, and for closing said cassette door when said lid lock member is in said unlock position; and
  a shutter lock member interlocking with said interlocking member, for prohibiting a operation of said shutter release button when said interlocking member opens said cassette door, and for allowing the operation of said shutter release button when said interlocking member opens said cassette door.

11. A camera having a shutter release button, wherein a photo film is advanced from a film cassette in correspondence with operation of said shutter release button, said camera comprising:
  a cassette chamber for containing said film cassette;
  a lid for opening and closing said cassette chamber; and
  a shutter lock mechanism for preventing an operation of said shutter release button when said lid is opened, and for allowing the operation of said shutter release button when said lid is closed;
  wherein said shutter lock mechanism includes a shutter lock member which is set in a lock position to lock said shutter release button when said lid is opened, and set in an unlock position to unlock said shutter release button when said lid is closed.

12. A camera according to claim 11, wherein in said lock position a part of said shutter lock member is entered in a moving path of said shutter release button such that said shutter release button cannot be depressed, and in said unlock position said part is retracted from said moving path such that said shutter release button may be depressed.

13. A camera according to claim 12, wherein said shutter lock mechanism further includes a lid lock member disposed between said lid and said shutter lock member, said lid lock member engages with said lid when said lid is closed, and disengages from said lid when said lid is opened.

14. A camera according to claim 13, wherein said shutter lock mechanism includes an interlocking member contacting to both of said lid lock member and said shutter lock member, and said interlocking member transmits movement of said lid lock member to said shutter lock member.

15. A camera according to claim 14, wherein said interlocking member has a protrusion, said shutter lock member has a contact portion for contacting said protrusion of said interlocking member to set said shutter lock member to a lock position when a lid is opened, and said protuberance leaves from said contact portion so as to set said shutter lock member in said unlock position when said lid is closed.

16. A camera according to claim 15, wherein said shutter lock member has a plate-like spring portion for biasing said shutter lock member such that said contact portion may contact to said interlocking member.

17. A camera according to claim 15, wherein said lid lock member is biased by a coil spring forwards said engaging position.

18. A camera according to claim 15, wherein said shutter lock member is attached to a top of said cassette chamber.

19. A camera according to claim 12, wherein said shutter lock member is rotatably attached to a side wall of said cassette chamber and biased by a spring to said lock position, and a part of said lid of said cassette chamber contacts to said shutter lock member so as to move said shutter lock member to said unlock position when said lid closes said cassette chamber.

* * * * *